United States Patent
Gross et al.

(10) Patent No.: US 7,272,152 B2
(45) Date of Patent: Sep. 18, 2007

(54) METHOD FOR REAL-TIME COMMUNICATION BETWEEN A NUMBER OF NETWORK SUBSCRIBERS IN A COMMUNICATION SYSTEM USING ETHERNET PHYSICS, AND A CORRESPONDING COMMUNICATION SYSTEM USING ETHERNET PHYSICS

(75) Inventors: Markus Gross, Fuerth (DE); Ulrich Hahn, Fuerth (DE); Peter Jaenicke, Erlangen (DE); Oswald Kaesdorf, Grossenseebach (DE); Martin Teckentrup, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 1003 days.

(21) Appl. No.: 09/918,005

(22) Filed: Jul. 30, 2001

(65) Prior Publication Data
US 2002/0037007 A1    Mar. 28, 2002

(30) Foreign Application Priority Data
Sep. 27, 2000   (DE) .............................. 100 47 925

(51) Int. Cl.
*H04L 12/413*   (2006.01)
*H04L 12/403*   (2006.01)
*H04J 3/06*   (2006.01)

(52) U.S. Cl. .................. 370/447; 370/449; 370/509
(58) Field of Classification Search .............. 370/445, 370/447, 449, 509–510, 512–514, 503, 249, 370/442
See application file for complete search history.

(56) References Cited

U.S. PATENT DOCUMENTS

| | | | | |
|---|---|---|---|---|
| 4,010,326 A | * | 3/1977 | Schwartz | 370/438 |
| 4,502,137 A | * | 2/1985 | Tan | 370/445 |
| 5,544,314 A | * | 8/1996 | Fuchsreiter et al. | 709/223 |
| 5,596,578 A | * | 1/1997 | Cunningham | 370/364 |
| 5,706,430 A | * | 1/1998 | Yanagisawa et al. | 711/141 |
| 5,734,329 A | | 3/1998 | Khosrowpour et al. | 340/825.21 |

(Continued)

FOREIGN PATENT DOCUMENTS

DE         197 21 740 A1    11/1998

(Continued)

OTHER PUBLICATIONS

"Standard Field Bus Networks for Industrial Applications" by Cena et al.; *Computer Standards & Interfaces*, Jan. 15, 1995, pp. 155-167.

(Continued)

*Primary Examiner*—Chi Pham
*Assistant Examiner*—Tri H. Phan
(74) *Attorney, Agent, or Firm*—Baker Botts L.L.P.

(57) ABSTRACT

For real-time communication between a number of network subscribers in a communication system using Ethernet physics, the slave units are synchronized to the master unit in that each slave unit is clocked via a respective timer with a predetermined overall cycle time, which timer is set cyclically by the reception of respective slave-specific synchronization information which is determined by the master unit. In this case, each timer in a slave unit automatically starts a new cycle once the predetermined overall cycle time has elapsed, even in the absence of the respective synchronization information. Access control for the transmission mode and reception mode between the network subscribers is provided using a timeslot access method.

13 Claims, 4 Drawing Sheets

U.S. PATENT DOCUMENTS

| | | | | |
|---|---|---|---|---|
| 5,974,056 A | * | 10/1999 | Wilson et al. | 370/509 |
| 5,978,578 A | | 11/1999 | Azarya et al. | 395/701 |
| 6,215,797 B1 | * | 4/2001 | Fellman et al. | 370/503 |
| 6,516,364 B1 | * | 2/2003 | Kolblin et al. | 710/100 |
| 6,661,804 B2 | * | 12/2003 | Fellman et al. | 370/420 |
| 6,711,131 B1 | * | 3/2004 | Shiobara | 370/235 |
| 2002/0075890 A1 | * | 6/2002 | Kim et al. | 370/442 |

FOREIGN PATENT DOCUMENTS

| | | |
|---|---|---|
| EP | 0784393 | 1/1997 |
| WO | 0011820 | 3/2000 |

OTHER PUBLICATIONS

"A Low Cost Optical Slotted Ring Network for RS-232C Based Communications", PROC. IEEE, Nov. 22, 1989, by Sastry et al.; pp. 646-649.

Timothy J. King, "The Fibre Distributed Data Interface (FDDI)—a New Generation Statndard for Local Area Networks", Jun. 13, 1988 IEEE N.3.2, pp. 239-242.

* cited by examiner

METHOD FOR REAL-TIME COMMUNICATION BETWEEN A NUMBER OF NETWORK SUBSCRIBERS IN A COMMUNICATION SYSTEM USING ETHERNET PHYSICS, AND A CORRESPONDING COMMUNICATION SYSTEM USING ETHERNET PHYSICS

FIELD OF THE INVENTION

The invention relates to a method for real-time communication between a number of network subscribers in a communication system using Ethernet physics, wherein a master unit and one or more slave units communicate with one another by means of messages which are transmitted via the network.

BACKGROUND OF THE INVENTION

As widely differing technical systems are increasingly networked, there is a growing requirement for standardized structures in industry. In this context, it is also desirable to be able to couple any desired appliances locally. In order to provide open systems for networking, it is necessary to provide simple and cost-effective communication mechanisms which enable industrial appliances to have a networking capability. In particular, this requirement also exists in the context of the coupling of drive components, such as drive controllers, power sections and transmitters, for numerically controlled machine tools and robots, in which a number of interpolating axes must be operated synchronously.

In present-day high-performance drive systems, the interfaces to transmitters and power sections are in the form of analog signal interfaces. This, however, involves considerable restrictions relating to the spatial distribution capability, since the susceptibility to interference from EMC effects (EMC stands for electromagnetic compatibility) increases with the cable length. If the performance requirements are low, proprietary company serial digital transmission systems are generally used. Where the performance requirements are high, the communication between the drive controller and the movement controller is provided by proprietary-company serial data transmission systems.

Recently, with regard to the requirement to provide industrial appliances with a networking capability the ETHERNET (data transmission rate 10 Mbps), in particular the FAST ETHERNET (data transmission rate 100 Mbps—IEEE Standard 802.3-1998) data transmission technology which is known from office technology, has been becoming increasingly important. This is due to the fact that this development represents an undefined Standard with regard to compatibility and, furthermore, is available at low cost, since appropriate interface hardware is being produced in large quantities, owing to the widespread use in the field of personal computers. Furthermore, ETHERNET networks are already widely used in many organizations, so that a widely extended infrastructure can already be made use of. These arguments all favor the use of the ETHERNET in the field of automation technology as well. ETHERNET is generally used in the field of Local Area Networks LAN, with the most widely used transmission protocol being TCP/IP (Transmission Control Protocol/Internet Protocol).

Accordingly, the IEEE Standard 802.3, CSMA/CD (Carrier Sense Multiple Access/Collision Detect) is generally used as the access method. In this method, all the network subscribers have equal priority, and any network subscriber is allowed to send a message on the network, generally a bus system at any time. However, a problem occurs in this case when two or more subscribers are sending a message at the same time. In this situation, a collision is identified, and each subscriber involved is then assigned a waiting time, which is defined randomly, before another attempt to send the message is made. The term statistical access method is therefore used.

The requirements for the performance of communication systems for automation technology are particularly stringent, for example when coupling drive components. When interchanging data between transmitters, power sections and a drive controller, the data transmission time, which is included in the control loop as a dead time, is a particularly important parameter. The shorter this dead time, the better the dynamic response which can be achieved by the control system.

The connection between movement controllers and drive controllers is also sensitive to dead times, since a control loop is also closed via this connection. There is thus a problem in particular in the data transmission time for serial communication systems, which can be solved only by an appropriately fast system with a real-time capability, that is to say a deterministic system. However, the fact that communication using ETHERNET networks does not ensure a determined time response runs counter to their use for automation technology. The ETHERNET Standard therefore does not offer the technical preconditions for real-time communications.

IEEE Standard 802.3 defines a message frame which is not suitable for this purpose. Since, however, the components for physical ETHERNET signal transmission are independent of the Standard protocol form, the developer has freedom to choose the protocol form in which the data are to be transmitted. Only Layer 1 (the physical layer) is adopted from IEEE Standard 802.3.

SUMMARY OF THE INVENTION

The object of the present invention is to provide a transport protocol which allows real-time communication while including the widely used Ethernet physics. According to the present invention, this object is achieved by a method for real-time communication between a number of network subscribers in a communication system using Ethernet physics, wherein:
 a master unit and one or more slave units communicate with one another by means of messages which are transmitted via the network;
 the messages are interchanged cyclically with equidistant sampling times, in that each slave unit is synchronized to the master unit by means of a common timebase; and
 access control for the transmission mode and reception mode is carried out between the network subscribers using a timeslot access method.

Since the aforementioned applications require both high-precision compliance with the real-time condition and a high level of security and reliability in the transmission, the standardized transmission layer 2 (message frame and access method) of the (Fast) Ethernet, which does not satisfy these requirements, is completely redefined by a new message frame and a new access control method, and the Ethernet physics are thus used as the basis for real-time communication between, for example, drive components. Both the communication between the control unit and the transmitters and power sections, and the connection to a movement controller, can be provided in this way.

With regard to synchronization between the master and slave units, it has been found to be advantageous for the slave units to be synchronized to the master unit by each slave unit being clocked via a respective timer with a predetermined overall cycle time, which is set cyclically by the reception of a respective slave-specific synchronization information item, which is determined by the master unit. A master-slave communication architecture is thus used. In order to allow cyclic data interchange with identical sampling times to be provided, a common time base is produced for the master and all the slaves. The slaves are synchronized to the master by means of specifically defined messages, defined in time, from the master to the slaves, and individually configured timers in the slaves. User data messages and specific synchronization messages, which contain the respective synchronization information, can be transmitted in this way. Alternatively, the synchronization information can also be integrated in a specifically defined user data message. The stability of the communication system can be further enhanced if each timer in a slave unit automatically starts a new cycle once the predetermined overall cycle time has elapsed, even in the absence of the respective synchronization information.

A timeslot access method, which is initialized by the master in the network and allows optimum dead-time data transmission, is used for cyclic data transmission for the transmission and reception modes. Accordingly, messages can be monitored precisely for premature or delayed transmission, or for transmission subject to interference. For this purpose, only the master unit, has transmission authorization on the network for initialization, and reports to each slave unit which has only response authorization, via an appropriate slave-specific message. In addition to the overall cycle time, the time slots within the overall cycle time determine when the respective slave unit will receive messages from the master unit and the times at which it should send its messages. It has been found to be advantageous if each slave unit is told the respective synchronization time in the initialization phase.

Simultaneous and equidistant sampling for a control system can be achieved by storing instantaneous values in each slave unit at a common time, in particular at the start of a cycle.

In a preferred embodiment of the method according to the present invention, monitoring information is provided in each message which is transmitted by the master unit to a slave unit, by means of which security or safety functions which are provided in the slave unit can be activated directly via a second initiation channel.

The user data can be transported in a message frame which, in addition to slave addressing and message length information, provides protection of the data integrity by means, for example, of a CRC checksum and further security and safety related data areas. The data in the message frame can be evaluated not only by an application processor, but also by a communication module, which allows a second initiation channel. For this purpose, each slave unit sends a life signal with each message to the master unit. The absence of this signal indicates that the slave system has crashed, and the master unit stops this slave unit in a controlled manner by means of the second initiation channel (without the assistance of the slave unit). Furthermore, in the user data area of its message to the slave unit, the master unit can initiate a function in the slave unit, and can initiate this simultaneously by means of a signal in the second initiation channel. Two-channel initiation is thus achieved, which is an essential requirement for certain security or safety applications. The master unit can also send a master life signal in each of its messages to the slave units. In the absence of this signal, all the slaves react by stopping their own functions in a controlled manner.

Although the transmission technology based on the Ethernet Standard allows only point-to-point connections, it is also possible to form networks by using network nodes (which are referred to as HUBs) in (fast) Ethernet networks by a number of network subscribers, or each network subscriber, having one circuit part in order to form network nodes. The circuit part is used for passing on the messages in the direction of another master unit or further slave units, wherein communication between network subscribers via network nodes likewise takes place as claimed in one of the procedures described above.

Furthermore, separate transmitting and receiving lines between two network subscribers can be used simultaneously. This is done, for example, based on the rule that all the slave units transmit only in the direction of the master unit, and receive only messages directed from the master unit. This means that a message from the master in the direction of a slave and a message from a slave in the direction of a master can be transmitted simultaneously. This allows for full-duplex operation.

Real-time communication can be achieved on the basis of a communication system using Ethernet physics by means of the procedure described above. In this case, hierarchical networks can also be produced by means of point-to-point connections, connected via network nodes, using Ethernet physics for carrying out real-time communication in relatively large network topologies. This is also suitable for networking or coupling a distributed drive system, in that a first communication system comprises a numerical movement controller as the master unit and at least one control unit as the slave unit. Each control unit is used as the master unit for a further communication system, which has at least one power section for driving a motor and an associated transmission system as slave units.

Security and safety applications can also be provided since the communication between the drive components, such as a control unit, transmitter, power sections and movement controllers, is accomplished by means of an existing high-performance transmission system from the office communication field, by means of a completely new protocol, master-slave synchronization and a timeslot access method, for a real-time capability.

The use of the (fast) Ethernet transmission technology including the method according to the present invention thus results, inter alia, in the following advantages:
- low-cost line drivers, since large quantities of these are used in office communication technology—a proven technology which is also used in industry;
- the line drivers allow any desired protocol and full-duplex operation;
- better cable material can be used than for multi-core analogue signal cables;
- the distances between the components can be greater than when using analog signal cables;
- shorter dead times can be achieved by means of high transmission performance levels of up to 100 Mbps with fast Ethernet; and
- even complex networks can thus also be constructed.

DRAWINGS

Further advantages and details of the present invention are described below in conjunction with the figures, in which.

DETAILED DESCRIPTION OF THE INVENTION

Figure 1:
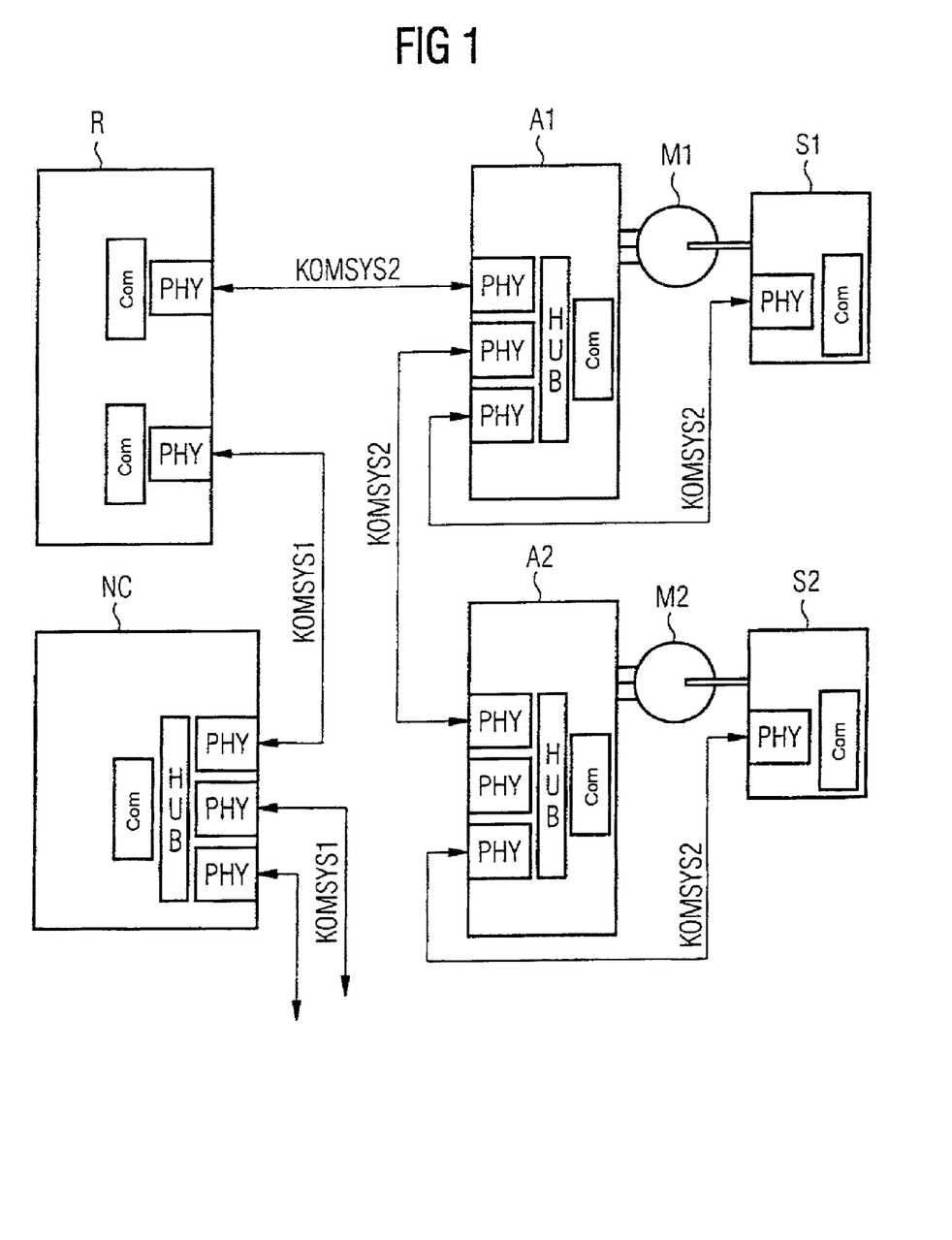
FIG. 1 shows an outline illustration of a movement controller and a drive appliance having two axes, based on the communication system of the invention.

FIG. 1 shows an example of a movement controller NC and of a drive appliance with two axes, which are coupled by means of a first communication system KOMSYS1 based on Ethernet physics. The drive controller R is connected to its power sections A1, A2 and transmitters S1, S2 by means of its own independent communication system KOMSYS2. Each power section A1 and A2 is used to drive the respective motor M1, M2, to which respective sensors S1, S2 in the form of transmitter systems are in turn connected, in order to detect the current, rotation speed and position and orientation information required for position and orientation control.

With regard to the first communication system KOMSYS1, the movement controller NC represents the master unit, which communicates with a number of controllers R (FIG. 1 shows only one control group, for the sake of clarity) as slave units. In the second communication system KOMSYS2, the controller R forms the master unit, while the actuators A1, A2 and sensors S1, S2 represent the slave units.

The network subscribers are connected via fast Ethernet line drivers PHY within each network subscriber. By way of example, the line driver modules PHY of the fast Ethernet are used for physical data transmission, on the basis of a copper cable having at least four cores, or a two-conductor optical waveguide.

In order to network different communication systems, all the network subscribers, or some of them (in the present case, the movement controller NC and the actuators A1, A2) have circuit parts HUB which are connected downstream from the line driver modules PHY and are used to pass on the messages in the direction of the master or further slaves. It is thus possible to form a hierarchical network, as shown in FIG. 1.

Figure 2:
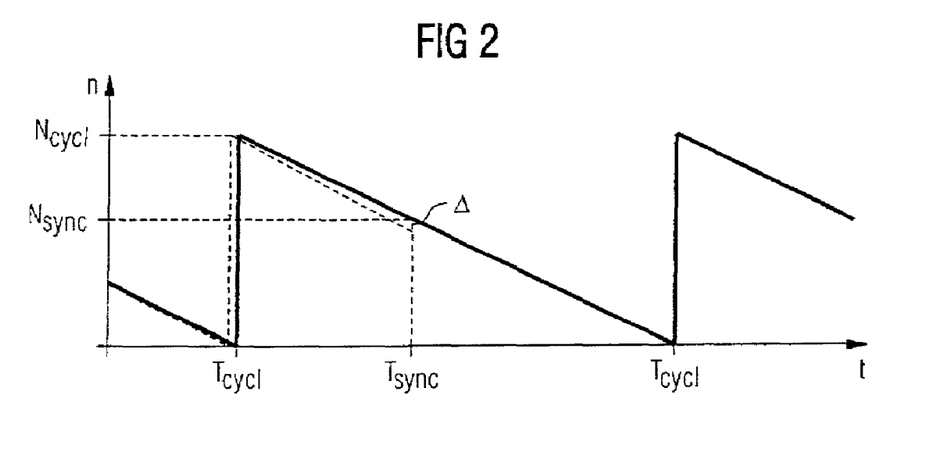
FIG. 2 shows a timing diagram of the timer synchronization in a slave.

The messages are passed via the line drivers PHY and any network nodes HUB to the respective protocol modules Kom, which process the message protocol and in which the timeslot access method according to the invention is used. To this end, the principle of synchronization between a master and a slave will be described first of all as is shown in FIG. 2, in the form of a timing diagram with counter values n plotted against time t. Each slave has a timer which is set to a specific value (Nsync) by the reception of a specifically defined slave-specific message (for example a synchronization message which may also transport user data) from the master relating to the synchronization time (Tsync). This value is calculated in advance by the master and is reported together with the overall cycle time (Tcycl) to the slave in an initialization phase. This method allows any possible brief failure of this slave-specific synchronization message to be bridged, since the counter starts a new cycle once the overall cycle time (Tcycl) has elapsed, even without any need to be corrected in the meantime by means of the synchronization message.

This is seen in FIG. 2, where the profile of a clock signal n with the overall cycle time (Tcycl) is plotted against time t. If the synchronization signal for the slave now fails for a number of cycles, then the timer continues to run autonomously. In this case, discrepancies can occur between the overall cycle clock (Tcycl) and the timer-internal clock, for example due to crystal drift in the counter. Such a clock error is shown in the form of a dotted line. Any error Δ which is present at the synchronization time (Tsync) can be corrected when a synchronization signal is once again available, and this resets the timer.

The crystal drift between a master and slave (for example ±100 ppm, crystal characteristic) together with the cycle time (Tcycl) of the cyclic data traffic governs the accuracy limits of the timeslots for access control. In this case:

cycle time×crystal drift>maximum accuracy of the timeslot (example: 1 ms×±200 ppm=±0.2 μs>maximum accuracy of the timeslot).

Each communication network KOMSYS1, KOMSYS2 of network subscribers consists of one, and only one, master unit and one or more slave units and, according to the invention, is operated for cyclic data interchange using a timeslot access method, in order to achieve optimum deadtime data transmission.

Figure 3:
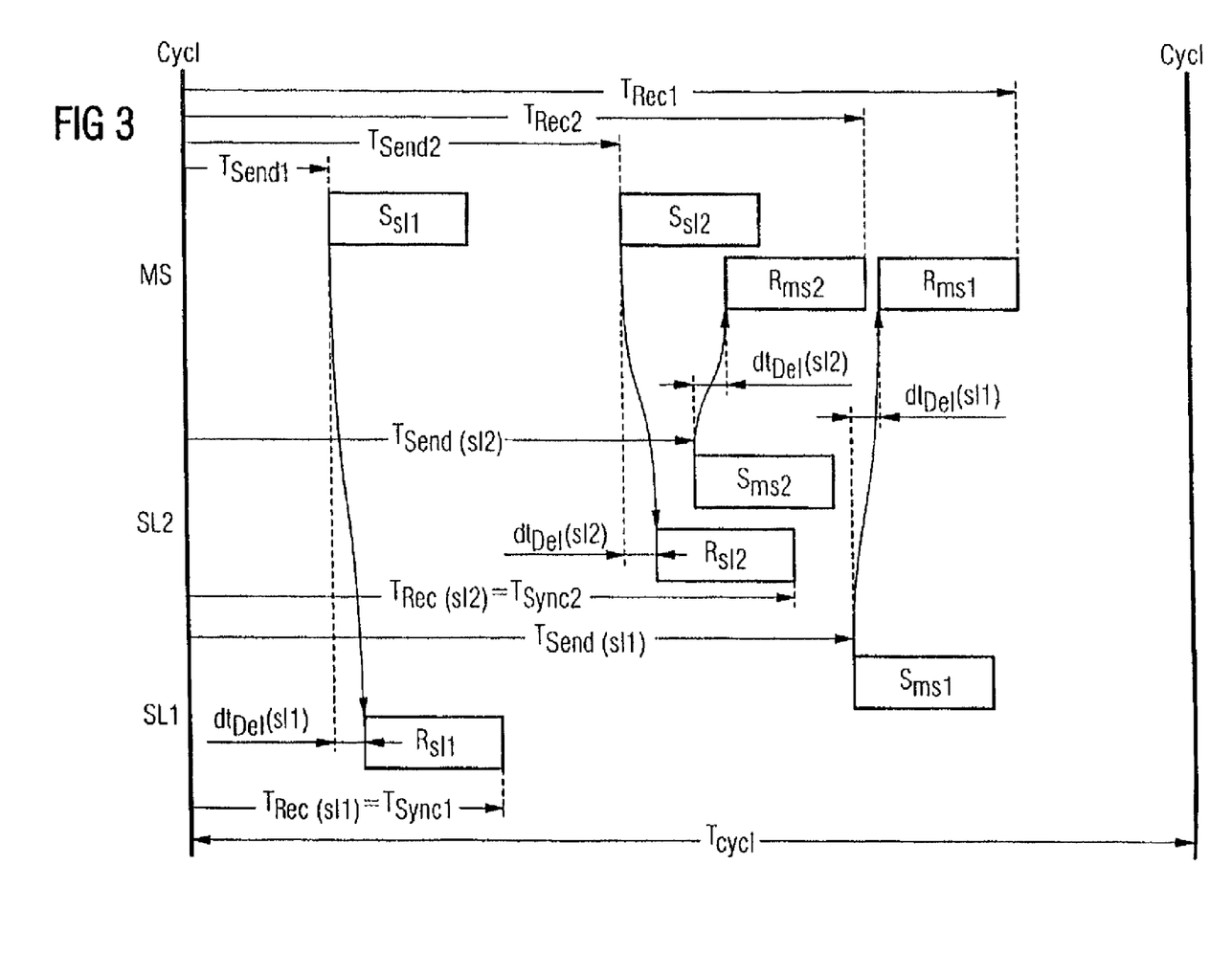
FIG. 3 shows an illustration of the timeslot access method.

In an initialization phase, in which only the master may transmit and only the slaves may respond, each slave receives the information on the times at which it will receive messages from the master and on the times at which it can send its message or its messages. The precise definition of the times at which the messages must be sent or received allows the communication to be controlled both at the master end and at the slave end. FIG. 3 shows the sequence of such a timeslot access method according to the present invention.

Specifically, FIG. 3 shows the access of a master unit MS to two slave units SL1 and SL2 within one overall cycle (Cycl) or (Tcycl). Once a first time Tsend1 has elapsed and after the start of the cycle, the master MS sends a transmitted message Ssl1 to the slave SL1. Owing to the delay times on the communication path, this message arrives at the slave unit SL1 as a received message Rsl1 with a certain time delay dtDel(sl1).

The interval between the end of the received message and the starting point of the respective overall cycle (Cycl) represents the reception time Trec(sl1) for the slave SL1, which corresponds to the specific synchronization signal Tsync1 for the slave SL1. At this time, the slave SL1 always receives its synchronization signal and its data. This time represents the clock time for the slave unit SL1, and its timer is set to a value corresponding to the time Tsync1. The slave SL1 is thus assigned the timeslot associated with this for reception of messages. The timer is, for example, decremented, with the set value being designed such that the counter zero crossing is coincident with the end of the overall cycle. The slave SL1 now sends its response message Sms1 to the master, to be precise exactly after a transmission time Tsend(sl1) for the slave SL1, measured from the start time of the respective overall cycle. This transmission time Tsend(sl1) is allocated in a fixed manner to the slave SL1, and represents its timeslot for sending messages. This message once again arrives with the delay dtDEL(Sl1) which is governed by the delay time in the communication path, as the received message Rms1 at the master unit MS. The time interval from the start time of the respective overall cycle (Cycl) and the end of the received message Rms1 represents the reception time Trec1 for the response from the slave SL1 from the point of view of the master MS.

The communication between the master MS and the second slave unit SL2 takes place on the basis of the same fundamental procedure. Once a further time Tsend2 has elapsed after the cycle start, the master MS sends a further transmitted message Ssl2 to the slave SL2. Owing to the delay times in the network, this message once again arrives as the received message Rsl2 at the slave unit SL2 with a certain time delay dtDel(sl2).

The interval between the end of the received message and the start time of the respective overall cycle (Cycl) represents the reception time Trec(sl2) for the slave SL2. This corresponds to the specific synchronization signal Tsync2 for the slave SL2. The slave SL2 always receives its synchronization signal and its data at this time. This time thus represents the clock time for the slave unit SL2 in a corresponding manner, and its timer is set to a value corresponding to the time Tsync2.

The slave SL2 is thus assigned the timeslot associated with this for receiving messages. The timer is, for example, likewise decremented, with the set value being designed such that the counter zero crossing is coincident with the end of the overall cycle. The slave SL2 sends its response message Sms2 to the master MS, to be precise exactly after a transmission time Tsend(sl2) for the slave SL2, which is measured from the start time of the respective overall cycle. This transmission time Tsend(sl2) is allocated in a fixed manner to the slave SL2 and represents the timeslot for sending messages. The slave unit SL2 can therefore start to send a message Sms2 to the master MS only before complete reception of the message Rsl2, since the corresponding time slot for sending after Tsend2 is already known from a previous period of the overall cycle (Cycl), and the slave unit SL2 is thus already in the steady synchronization state.

This message also arrives with the delay dtDEL(sl2), which is governed by the delay time on the communication path, as the received message Rms2 at the master unit MS. The time interval from the start time of the respective overall cycle (Cycl) and the end of the received message Rms2 represents the reception time Trec2 for the response from the slave SL2 from the point of view of the master MS.

The procedure for the other slave units likewise correspond with each slave unit being allocated its own exclusive timeslot. Hence, it is possible to immediately identify not only interference, but also delayed or premature transmission of a message. A specific message to a slave is used for synchronization in addition to data transmission.

Apart from timeslot control, the synchronization also means that the actual values can be stored in all the slaves at a specific common time, in this case the start of the cycle (Cycl), in order to achieve simultaneous, equidistant sampling for the controller R. To this end, the respective actual value from each slave unit, in particular from the sensors and transmitter systems S1 and S2, is stored when the corresponding timer reaches its zero crossing, and is then transmitted to the higher-level master unit NC or R. In the case of the drive system with two coupled axes shown in FIG. 1, the slave units S1, S2 supply corresponding rotation speed, position and orientation actual values.

Figure 4:
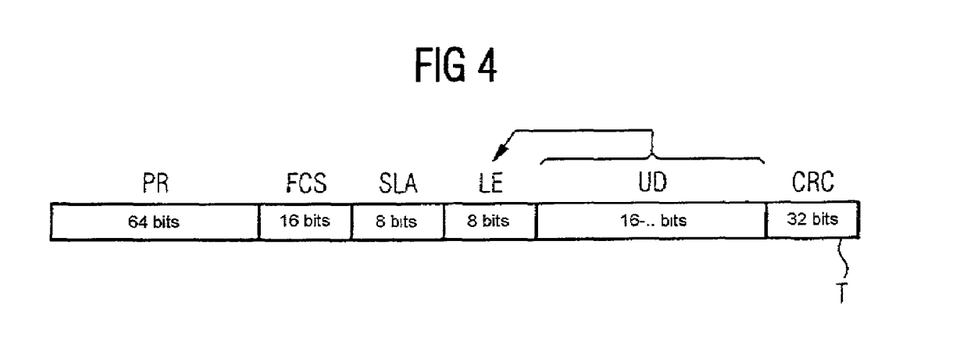
FIG. 4 shows an illustration of one possible message frame.

FIG. 4 shows one possible message frame for a message T to be interchanged via the network. The message starts with a message preamble PR, the length of which is, for example, 64 bits. This is followed by a function code sequence FCS of 16 bits, which is explained in the following text with reference to FIG. 5. This is followed by 8 bits with the address SLA of the slave unit. In this case, the number of bits required depends on the number of slave units to be addressed. If there are 8 bits, the number of slaves which can be addressed is 255 (the value ZERO is normally reserved for a broadcast function). This is followed by the length LE of the subsequent user data DU. The message length is thus variable. The message frame ends with a checksum CRC with a length, for example, of 32 bits (CRC stands for cyclic redundancy check, a known method for error monitoring).

Figure 5:
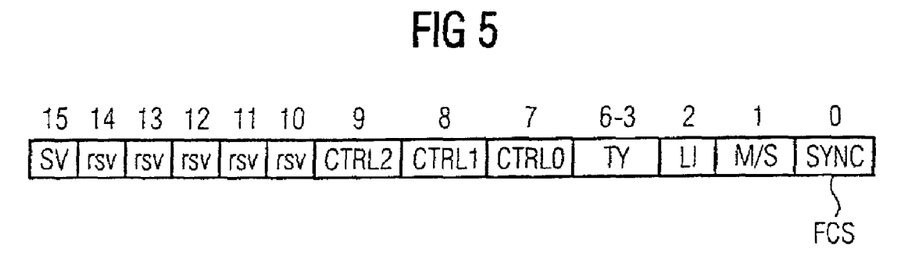
FIG. 5 shows an illustration of one possible function code within a message frame.

FIG. 5 shows one possible detailed view of the section comprising the function code sequence FCS. The most significant bit contains a supervisor bit SV. This represents a sign of life such that, for example if the control software crashes, it is no longer set in the master. This allows, for example, a change to a safe state to be initiated in the slave.

The bits 14 to 10 are reserved for any desired tasks. They are followed by three control bits CTRL0 to CTRL2, an area of three to six bits for storing the message type TY and a further bit LI which signals whether any length information is present or whether a fixed, standardized message length can be assumed. The bit M/S signals whether this is a message which is being transported from a master to a slave or vice versa, and thus indicates the transport direction. The last bit SYNC indicates whether this is a synchronization message or a user message. It is also feasible for the SYNC bit to be used to signal that the message contains additional synchronization data as well as user data.

Figure 6:
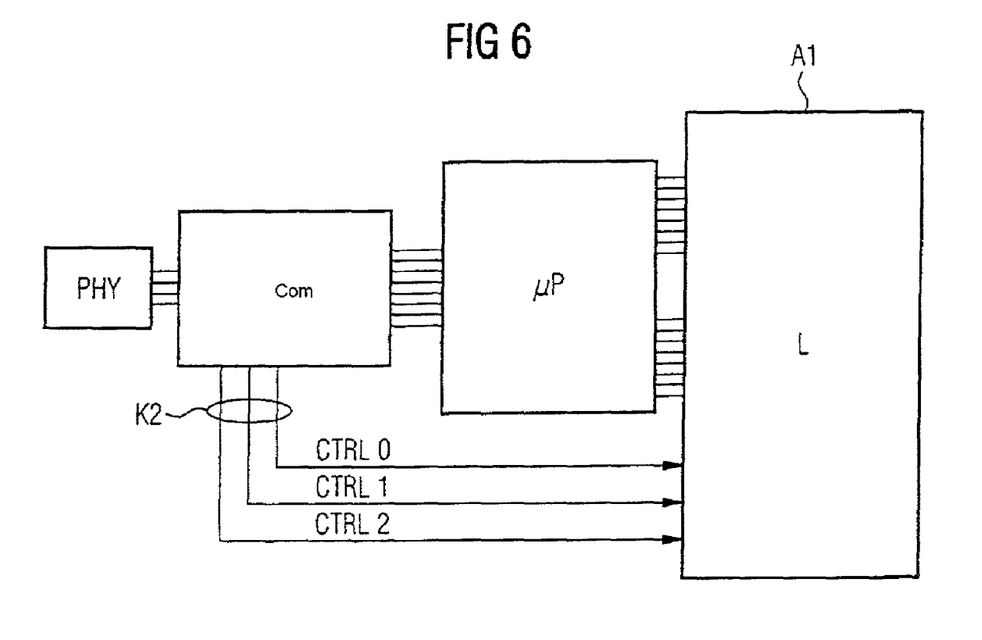
FIG. 6 shows an outline illustration for a second initiation channel for security and safety applications.

The control bits CTRL0 to CTRL2 are used, for example, to provide specific security or safety functions, such as those which are required, in particular, in the field of industry automation. One possible implementation of a security or safety function with the aid of the control bits CTRL0 to CTRL2 is shown in FIG. 6 which shows a block diagram with the internal construction of a slave unit, for example of the power section A1, from the drive controller shown in FIG. 1.

If the module Kom, which receives the message via the line driver PHY and implements the communication protocol, is independent of a microprocessor µP in the slave application (the actual power section L), specific application events can be initiated in the slave A1 by means of the control bits CTRL0 to CTRL2 without requiring the microprocessor µP and the corresponding software in the slave A1. This corresponds to a second initiation channel K2 as is required for certain security and safety applications (for example emergency stop etc.).

The above method steps according to the invention allow a communication network with a deterministic time response, and hence the capability for real-time communication, to be achieved, in particular for industry automation as well, on the basis of Ethernet physics.

We claim:

1. A method for real-time communication between a number of network subscribers in a communication system using Ethernet physics, comprising the steps of transmitting messages via Fast-Ethernet devices to establish communication between a master unit and one or more slave units with one another, synchronizing the master unit and the one or more slave units by means of a common timebase to interchange messages cyclically within a total cycle time, and assigning each slave unit a first timeslot within said total cycle time for transmission of a telegram and a second timeslot for reception of a telegram; and assigning the master unit a third timeslot within said total cycle time for transmission of a telegram and a fourth timeslot for reception of a telegram, wherein each slave unit being timed by way of a respective counter with a preassigned total cycle time, the respective counter being set cyclically by reception of respective slave-specific synchronization information determined by the master unit and each counter of a slave unit, even in the absence of the respective synchronization information after expiration of the preassigned total cycle time automatically starting a new cycle.

2. A method according to claim 1 wherein the synchronization information comprises a respective synchronization time and an associated number value assigned for each slave unit.

3. A method according to claim 2, wherein the respective synchronization information, the total cycle time, the timeslots are assigned to each slave during an initialization phase.

4. A method according to claim 1, wherein current instantaneous values are stored in each slave unit at a common point of time.

5. A method according to claim 1, wherein each slave unit in each telegram sends a signal to the master unit and the master unit, in the absence of said signal, controlledly stops the corresponding slave unit.

6. A method according to claim 1, wherein each slave unit with each telegram receives control information from the master unit with which, by way of a second triggering channel, safety-oriented functions provided can be activated directly in the slave unit.

7. A method according to claim 1, wherein each slave unit with each telegram receives from the master unit a master sign-of-life signal, and each slave unit in the absence of said signal automatically stopping itself.

8. A method according to claim 1, wherein separate transmission and reception lines between two network subscribers are used simultaneously, in that all slave units will transmit only in the direction towards the master unit, and receive telegrams only from the master unit from the master direction.

9. A method of real time communication between network subscribers to several communication systems with Ethernet physics, wherein a majority of network subscribers having a circuit part to form network nodes, serving to pass along the telegrams towards another master unit or additional slave units, wherein the network subscribers communicating with each other directly within each communication system or via a network node according to claim 1.

10. A distributed drive system with hierarchical network for real-time communication between a number of communication systems using Ethernet physics, the distributed drive system comprising a first communication system including a numeric motion control as master unit and at least one regulating unit as slave unit, each regulating unit serving as master unit of an additional communication system comprising at least one power part to trigger a motor and an associated emitter system as slave units, the system further comprising:
means for transmitting messages via Fast-Ethernet devices to establish communication between a master unit and one or more slave units with one another,
means for synchronizing the master unit and the one or more slave units by means of a common timebase to interchange messages cyclically within a total cycle time,
means for assigning each slave unit a first timeslot within said total cycle time for transmission of a telegram and a second timeslot for reception of a telegram; and
means for assigning the master unit a third timeslot within said total cycle time for transmission of a telegram and a fourth timeslot for reception of a telegrams,
wherein each slave unit comprises a counter for timing a preassigned total cycle time, the respective counter being set cyclically by reception of respective slave-specific synchronization information determined by the master unit and each counter of a slave unit, even in the absence of the respective synchronization information after expiration of the preassigned total cycle time automatically starting a new cycle.

11. A system for real-time communication between a number of network subscribers in a communication system using Ethernet physics, comprising:
means for transmitting messages via Fast-Ethernet devices to establish communication between a master unit and one or more slave units with one another,
means for synchronizing the master unit and the one or more slave units by means of a common timebase to interchange messages cyclically within a total cycle time,
means for assigning each slave unit a first timeslot within said total cycle time for transmission of a telegram and a second timeslot for reception of a telegram; and
means for assigning the master unit a third timeslot within said total cycle time for transmission of a telegram and a fourth timeslot for reception of a telegram, wherein each slave unit is operable to receive with each telegram from the master unit a master sign-of-life signal, and each slave unit comprises means which in the absence of said signal automatically stop the slave unit.

12. A method for real-time communication between a number of network subscribers in a communication system using Ethernet physics, comprising the steps of
transmitting messages via Fast-Ethernet devices to establish communication between a master unit and one or more slave units with one another,
synchronizing the master unit and the one or more slave units by means of a common timebase to interchange messages cyclically within a total cycle time, and
assigning each slave unit a first timeslot within said total cycle time for transmission of a telegram and a second timeslot for reception of a telegram; and
assigning the master unit a third timeslot within said total cycle time for transmission of a telegram and a fourth timeslot for reception of a telegram,
wherein each slave unit with each telegram receives control information from the master unit with which, by way of a second triggering channel, safety-oriented functions provided can be activated directly in the slave unit.

13. A method for real-time communication between a number of network subscribers in a communication system using Ethernet physics, comprising the steps of
transmitting messages via Fast-Ethernet devices to establish communication between a master unit and one or more slave units with one another,
synchronizing the master unit and the one or more slave units by means of a common timebase to interchange messages cyclically within a total cycle time, and
assigning each slave unit a first timeslot within said total cycle time for transmission of a telegram and a second timeslot for reception of a telegram; and
assigning the master unit a third timeslot within said total cycle time for transmission of a telegram and a fourth timeslot for reception of a telegram,
wherein each slave unit with each telegram receives from the master unit a master sign-of-life signal, and each slave unit in the absence of said signal automatically stopping itself.

* * * * *